US007977832B2

(12) United States Patent
Vadillo et al.

(10) Patent No.: US 7,977,832 B2
(45) Date of Patent: Jul. 12, 2011

(54) COOLING SYSTEM FOR A MOTOR AND ASSOCIATED ELECTRONICS

(75) Inventors: Jose L. Vadillo, St. Louis, MO (US); Raymond D. Heilman, Florissant, MO (US); Donald E. Morgan, Florissant, MO (US)

(73) Assignee: Nidec Motor Corporation, St. Louis, MO (US)

( * ) Notice: Subject to any disclaimer, the term of this patent is extended or adjusted under 35 U.S.C. 154(b) by 380 days.

(21) Appl. No.: 12/124,922

(22) Filed: May 21, 2008

(65) Prior Publication Data

US 2009/0289513 A1 Nov. 26, 2009

(51) Int. Cl.
*H02K 9/04* (2006.01)
*H02K 9/06* (2006.01)
*H02K 5/20* (2006.01)

(52) U.S. Cl. ............. 310/62; 310/58; 310/64; 417/366; 417/423.14

(58) Field of Classification Search ............ 310/62, 310/63, 58, 59, 64, 89; 417/366, 423.14
See application file for complete search history.

(56) References Cited

U.S. PATENT DOCUMENTS

| | | | | |
|---|---|---|---|---|
| 2,494,200 A | * | 1/1950 | Nils | ............ 310/52 |
| 4,314,170 A | | 2/1982 | Sahrbacker | |
| 4,992,687 A | * | 2/1991 | Nel | ............ 310/68 D |
| 5,331,239 A | | 7/1994 | Kwun et al. | |
| 5,763,969 A | | 6/1998 | Metheny et al. | |
| 6,661,140 B2 | | 12/2003 | Agnes et al. | |
| 6,933,638 B2 | | 8/2005 | Hirth | |
| 7,075,202 B2 | * | 7/2006 | Leoni | ............ 310/83 |
| 7,256,522 B2 | | 12/2007 | Johnson et al. | |
| 2009/0267432 A1 | * | 10/2009 | Henry et al. | ............ 310/71 |
| 2009/0289513 A1 | * | 11/2009 | Vadillo et al. | ............ 310/62 |

FOREIGN PATENT DOCUMENTS

| | | | |
|---|---|---|---|
| JP | 08205461 | * | 8/1996 |
| JP | 2005094949 | * | 4/2005 |
| WO | WO2005/043720 A1 | | 5/2005 |

* cited by examiner

*Primary Examiner* — Karl I Tamai
(74) *Attorney, Agent, or Firm* — Maginot, Moore & Beck LLP (57) ABSTRACT

A cooling system is provided for an electric motor having control circuitry and including a motor housing surrounding the motor. The motor drives at least one radial fan at one end thereof for directing airflow through the motor housing across the motor. A fan housing encloses the cooling fan and defines a diverter chamber radially outboard of the fan that is sized to divert a portion of the airflow away from the electric motor. A control box contains the control circuitry and includes a base having a heat sink for contacting the control circuitry. The base defines a plenum in communication with the diverter chamber and a channel in communication with the plenum and the heat sink to direct the diverted airflow across the heat sink.

16 Claims, 9 Drawing Sheets

Fig. 10

COOLING SYSTEM FOR A MOTOR AND ASSOCIATED ELECTRONICS

BACKGROUND

The present disclosure relates to cooling systems for electric motors as well as for the associated control electronics. The disclosed system is particularly useful for use with unidirectional radial fan cooling systems.

Figure 1:
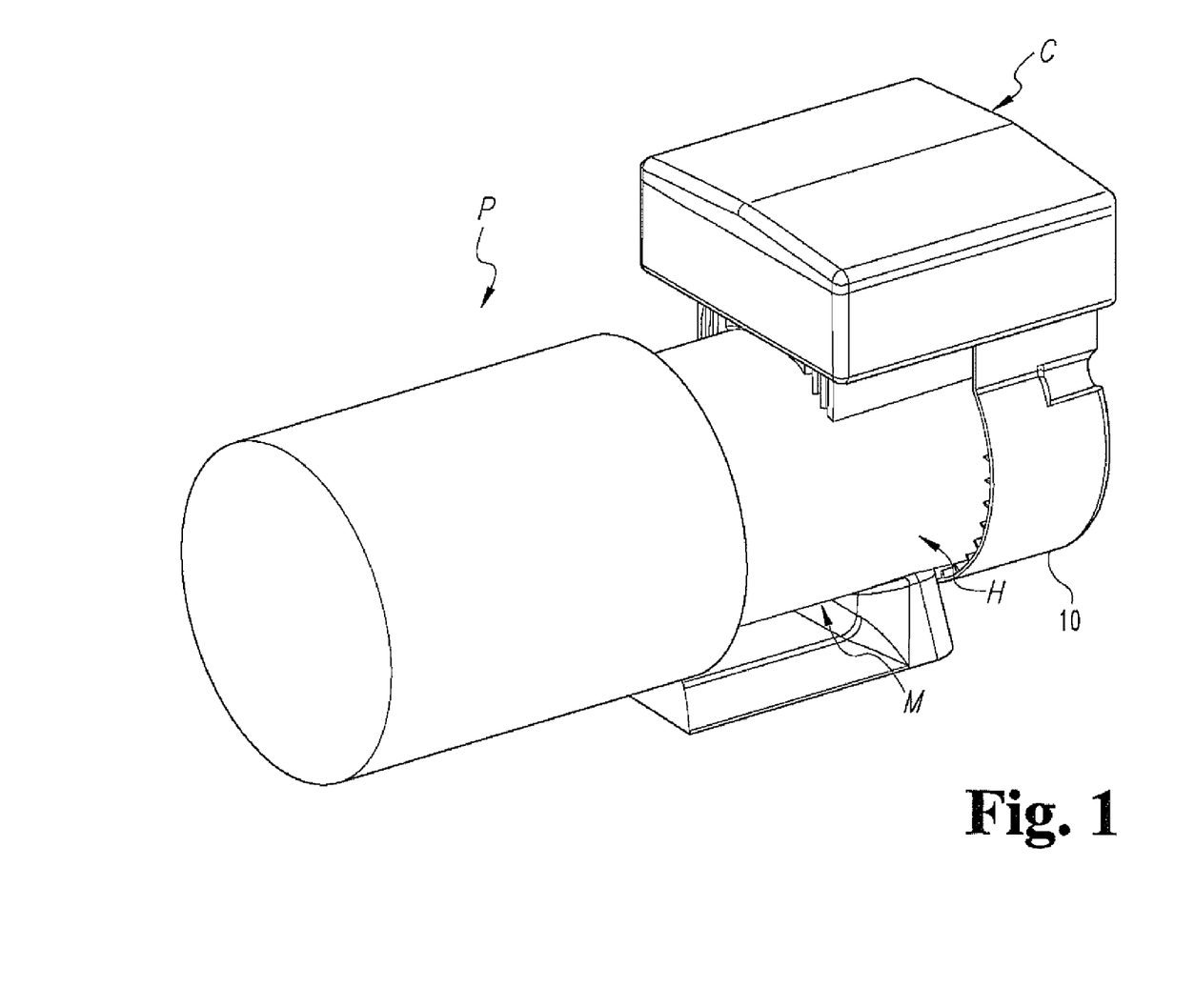
FIG. 1 is a perspective view of a pump installation incorporating the cooling system disclosed herein.

In one specific application of the cooling systems disclosed herein, a pump assembly P is driven by a motor assembly M, as illustrated in FIG. 1. A control box C is associated with the motor and houses electrical and electronic components used to the control the operation of the motor and/or the pump assemblies.

It is well known that electric motors generate a significant amount of heat that must be dissipated. Thus, the motor assembly typically includes at least one fan that is driven by the motor providing power to the pump assembly. A fan housing 10 encloses the fan and helps direct cooling air flow across the motor. A motor housing H also helps direct cooling air flow across the electric motor, relying upon heat transfer to draw heat from the motor.

It is also known that control circuitry in the form of electrical and electronic components used in the control box C generate heat. Moreover, if the arrangement is situated outdoors, direct sunlight may create a "mini-greenhouse" with the control box, although control boxes are typically provided in a color or with a coating that reflects sunlight to minimize any associated heat absorption. In any case, the electrical and electronic components with the control box C are subjected to increased temperatures, which can have a deleterious effect on the control components.

It is therefore desirable to provide a cooling system for the motor assembly M and for the control box C. Design limitations for a particular application may dictate space requirements available for any such cooling system. It is thus further desirable to provide the necessary cooling for the motor and electronic controls in as small a package as possible.

SUMMARY

A cooling system is provided for an electric motor having control circuitry and including a motor housing surrounding the motor. The motor drives at least one radial fan at one end thereof for directing airflow through the motor housing across the motor. In certain embodiments, the cooling system comprises a fan housing mountable to the motor housing at the one end of the motor, the fan housing defining a cavity surrounding the radial fan and configured to direct airflow from the fan axially through the motor housing. The fan housing further defines a diverter chamber radially outboard of the fan that is sized to divert a portion of the airflow away from the electric motor. The system further comprises a base having a heat sink for contacting the control circuitry. The base defines a plenum in communication with the diverter chamber and a channel in communication with the plenum and the heat sink to direct the diverted airflow across the heat sink.

The channel incorporates a plurality of cooling fins projecting therefrom into the airflow passing therethrough. The base may be supported on the motor housing by a mounting bosses that are sized to offset the base from the motor housing to define the channel. The cooling fins may thus be sized to contact the motor housing, to further define discrete flow paths through the channel.

In one exemplary embodiment, the channel includes a main channel corresponding to the heat sink and at least one channel adjacent the main channel. The main channel defines a flow area greater than the adjacent channels so the majority of the diverted airflow passes beneath the heat sink. Each of the channels includes a plurality of cooling fins. The fins in the main channel may include an angled leading edge adjacent the plenum to reduce recirculation of airflow entering the channel.

In another feature, the base includes a mating wall and side walls defining the plenum and the channel. These walls are configured for a close fit within the diverter chamber of the fan housing. The fan housing defines a raised lip at the interface between the walls and the diverter chamber to eliminate any sharp edges where the base and fan housing meet.

In yet another feature, the fan housing includes a circumferential surface defining the cavity within which the cooling fan rotates. The circumferential surface merges into a scroll surface adjacent the diverter chamber to smoothly direct airflow from the cooling fan into the chamber. In an additional feature, the air inlet into the fan housing may be surrounded by an interior circumferential wall to reduce or eliminate recirculation of air drawn into the housing by the rotating fan.

In accordance with one aspect of the cooling system, the control circuitry is contained within a box formed by the base and a cover. Thus, the base defines a hollow interior to contain the control circuitry therein. The boss further includes mounting bosses for supporting the base on the motor housing. The mounting bosses defining bolt openings in communication with the hollow interior and sized to receive mounting bolts therethrough for engagement with the motor housing. The mounting bosses define a drain channel between the mounting boss and the motor housing when the base is mounted thereon, with the drain channel in communication with a corresponding bolt opening.

These and other features and attributes of the cooling system disclosed herein will be appreciated upon consideration of the following written description.

DETAILED DESCRIPTION OF DRAWINGS

DESCRIPTION OF THE EMBODIMENTS

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 2:
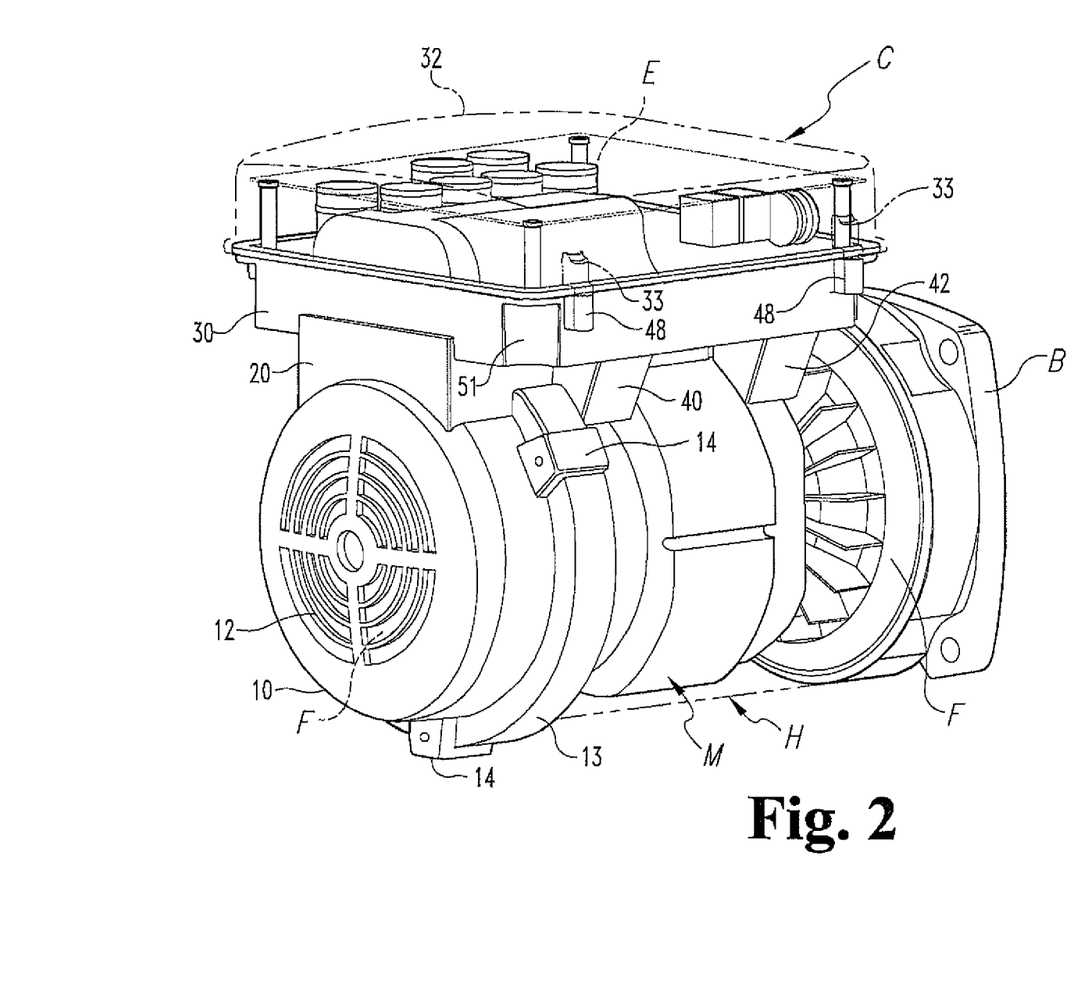
FIG. 2 is a side perspective view of a motor for user in the pump installation shown in FIG. 1, and equipped with one embodiment of the cooling system disclosed herein.

A motor assembly M incorporating the cooling system of the present disclosure is shown in FIG. 2. The assembly M includes a motor housing H that encloses the motor, shown in phantom in the figure. In addition to providing power to the associated appliance, such as the pump assembly P shown in FIG. 1, the electric motor also drives one or more cooling fans F, also shown in phantom in the figure. In some applications, radial fans are provided at both ends of the motor to enhance cooling air flow across the electric motor. The fans F are also enclosed within the motor housing H so that rotation of the fans produces axial air flow across the motor M.

One end of the motor assembly M is provided with a mounting plate B that is used to mount the assembly M to the appliance, such as the pump assembly P. A fan housing 10 is provided at the opposite end to enclose the end of the motor housing H and particularly the radial cooling fan F. The fan housing 10 defines a generally cylindrical cavity 11 within which the fan rotates. Inlet openings 12 are defined that provide an air inlet to the cavity and ultimately to the rotating fan. In a typical configuration, the inlet openings 12 are axially aligned with the fan and are concentrated toward the center of the fan housing 10 since the radial fan F will draw air in at its center and propel the air radially outward.

As further shown in FIG. 2, the control box C is mounted on the motor assembly M in accordance with one feature of the cooling system disclosed herein. Control circuitry in the form of electrical and electronic components E is contained within the control box C. The box includes a base 30 and a cover 32 that fully enclose the components E, such as with a fluid-tight seal. The interface between the base 30 and cover 32 may be configured to form the necessary seal, or a gasket or seal ring may be provided at the interface.

Figure 3:
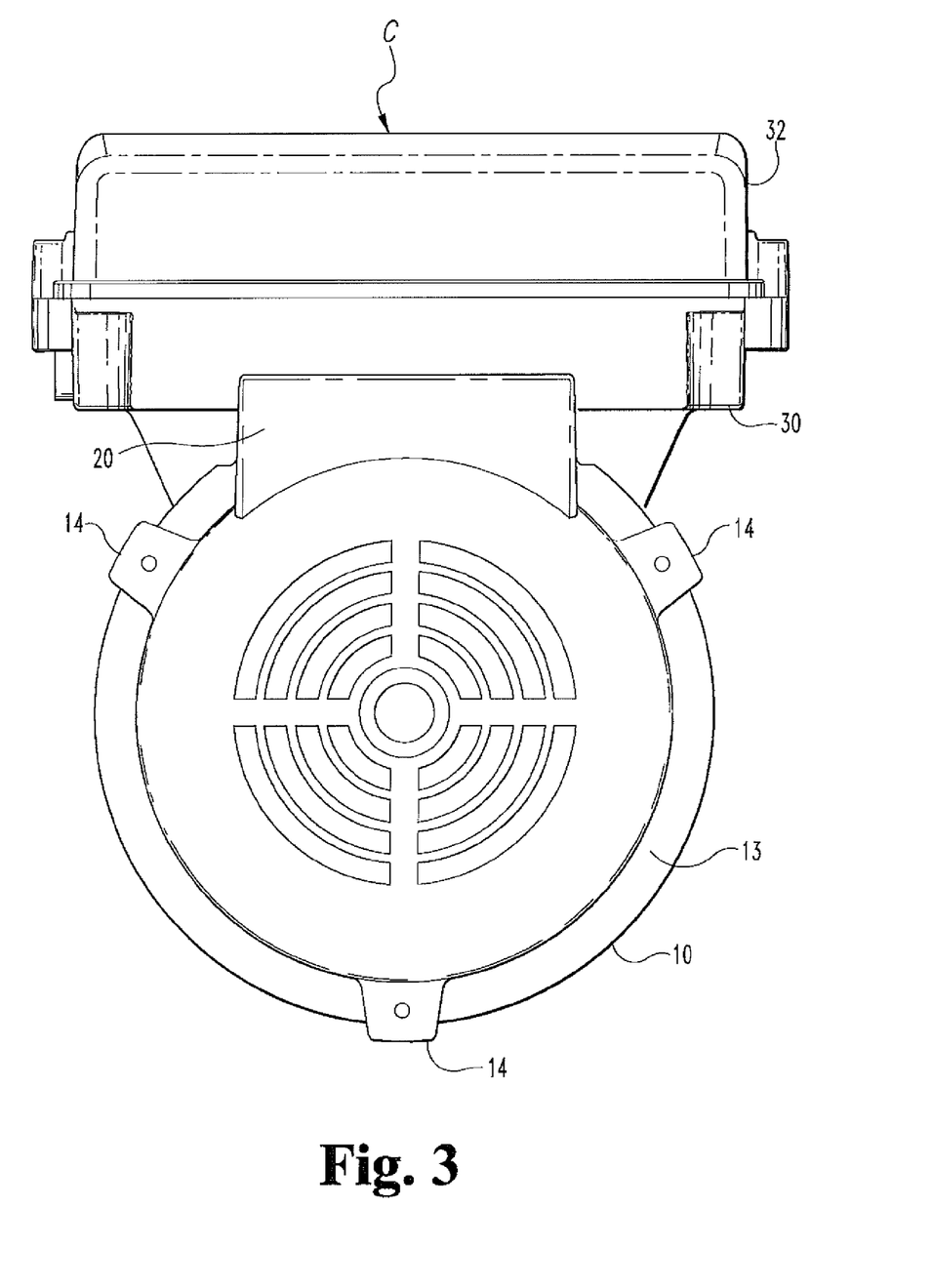
FIG. 3 is an end view of the motor and cooling system shown in FIG. 2.
Figure 4:
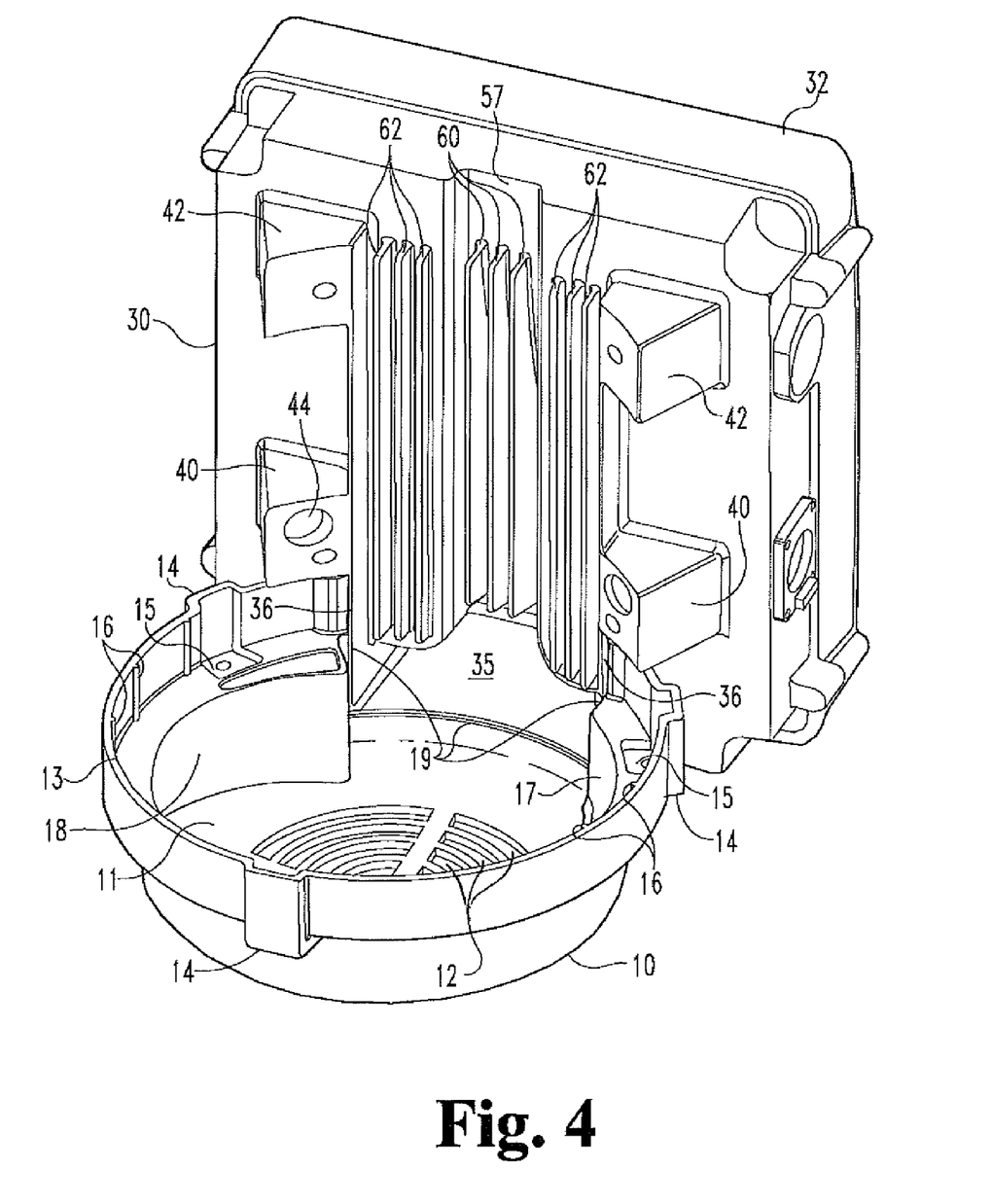
FIG. 4 is a bottom perspective view of one embodiment of the cooling system removed from the motor.

As shown in FIGS. 2-4, the fan housing 10 is provided with a circumferential flange 13 that encircles the motor housing H of the motor assembly. Mounting pads 14 are provided that coincide with bolt locations on the motor housing H so that the fan housing 10 can be readily mounted to the motor assembly with fasteners, such as bolts. In one feature of the cooling system disclosed herein, each of the mounting pads 14 includes a recess 15 at the interior of the circumferential flange 13. These recesses correspond to and cooperate with the bolt locations on the motor housing H so that the bolts do not interfere with the air flow circulating in the interior of the fan housing 10.

Figure 5:
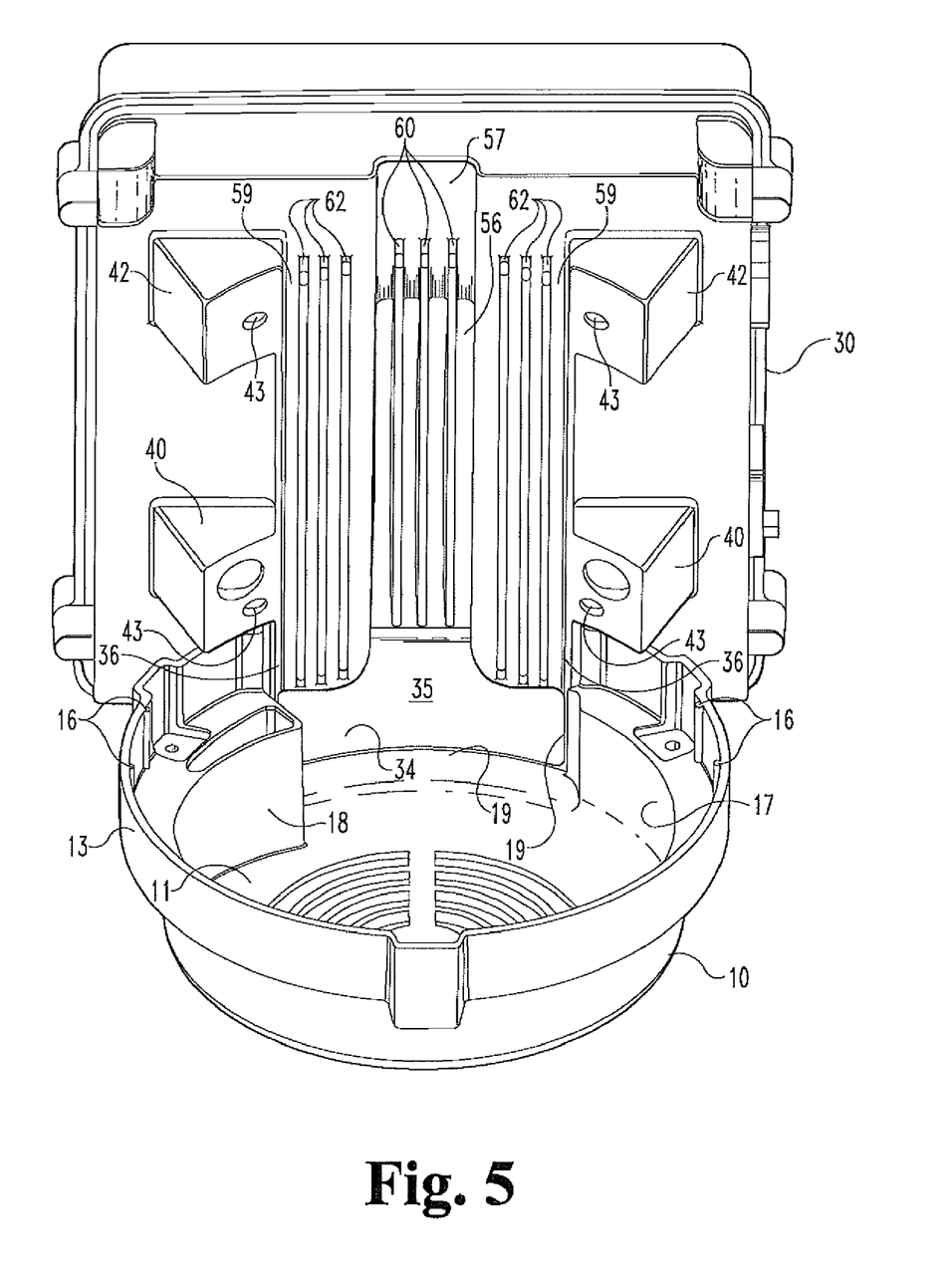
FIG. 5 is a further bottom perspective view of the cooling system shown in FIG. 4.

This air flow circulation is generated by the rotating radial fan F and an inner circumferential wall 17 of the fan housing 10, as shown in FIGS. 4-5. Thus, as air is directed radially outward by the rotating fan F, the inner circumferential wall 17 helps direct the air flow into a circulating pattern within the fan housing 10. In a typical motor cooling system, this circulating pattern directs the entire air flow axially across the motor within the motor housing H. In one important feature of the cooling system disclosed herein, a portion of that circulating air flow is diverted to help cool the control box C and the components E therein. Thus, as shown in FIG. 2, the fan housing 10 is provided with a diverter chamber 20 that interfaces with the base 30 of the control box C.

As shown best in FIGS. 4-5, the base 30 is provided with a diverter plenum 34 formed by a mating wall 35 and side walls 36. The mating wall 35 fits within, and may in one exemplary embodiment, bear directly against, the diverter chamber 20 of the fan housing 10. The side walls 36 fit tightly within the diverter chamber 20, such as bearing directly against the fan housing 10 to provide a seal. In a specific embodiment, the diverter chamber 20 is sized so that cooling airflow generated by the fan F is provided in a 3:1 ratio to the control box C and the motor M (i.e., the greater proportion of airflow passes through the heat sink). In a specific example, for a rotary fan having a diameter of about 6.0 in., the diverter chamber may have a width of about 3.3 in. As would be readily understood by one skilled in the art, other ratios may be provided without departing from the scope of embodiments of the invention.

In an exemplary embodiment, a lip 19 is provided around the interface between the mating wall 35 and side walls 36, and the diverter chamber 20. This lip 19 eliminates exposure of the sharp edge of the walls 35, 36 to the airflow, which might otherwise disrupt the flow. Thus, the interface of the lip 19 to the walls 35, 36 of the diverter plenum 34 in the base 30 of the control box C helps ensure a smooth flow transition from the fan to the control box.

In yet another feature, the fan housing 10 is provided with a scroll surface 18 integrated into the inner circumferential wall 17 of the fan housing. The scroll surface 18 is formed at a radius, relative to the center of the fan F, which may be successively shorter than the radius of the inner circumferential wall 17 and is operable to redirect the airflow from the radial fan into the diverter plenum 34. Alternatively, the radius of the scroll may be the same as the radius of the fan housing wall, but the origin of the scroll radius may be offset from the center of the fan. For instance, in a specific example, the inner circumferential wall may have a radius of about 3.0 in measured from the center of the fan F. The scroll surface 18 may be formed at that same 3.0 in. radius, but the origin for that radius may be offset by about 0.6 in. from the center of the fan.

In the illustrated embodiment, one scroll surface 18 is provided in the direction of rotation of the fan, where the fan is a uni-directional fan. The scroll surface 18 also increases the pressure within the fan housing 10 and reduces recirculation, which will ensure optimum airflow across the motor M even as some of the generated airflow is diverted to the control box C.

In one embodiment, the circumferential flange 13 may be sized to fit snugly over the outside of the motor housing H. In an alternative embodiment, the circumferential flange 13 is provided with a plurality of axial ribs 16 spaced around the circumference of the flange. These ribs thus offset the circumferential flange 13 from the outside of the motor housing H to which the fan housing 10 is mounted. This offset provides an axial flow path for additional cooling air to the outside of the motor housing H. Moreover, the axial ribs 16 are oriented axially to facilitate changing the direction of the moving air from a circumferential direction to an axial direction to better direct airflow axially along the motor housing H.

Figure 10:
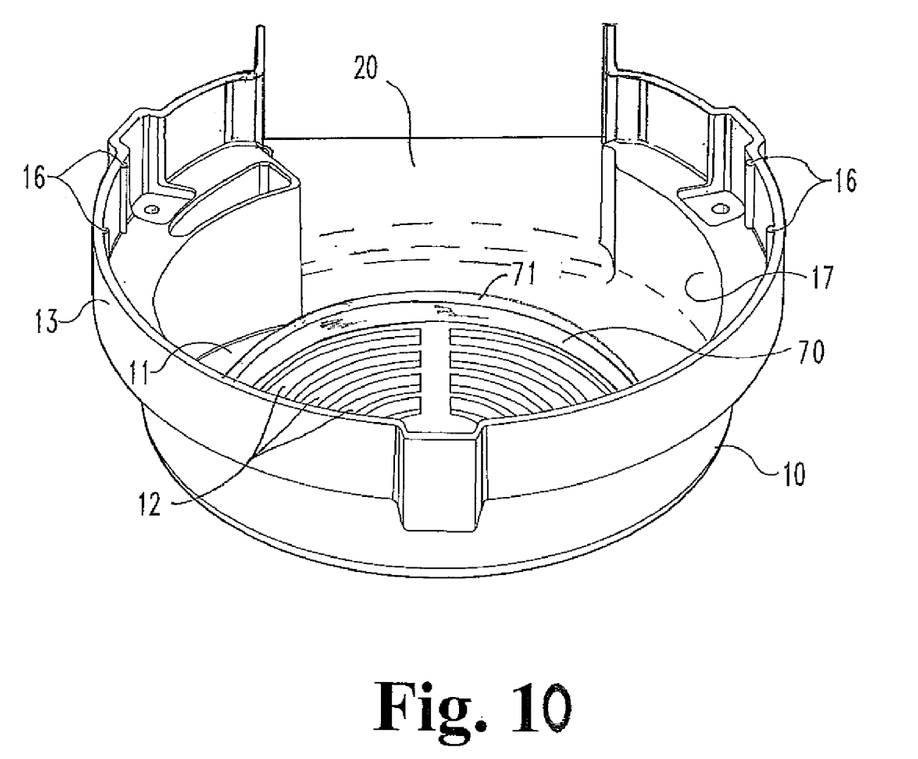
FIG. 10 is a bottom perspective view of the fan housing of the cooling system shown in FIGS. 4-5, with the housing modified to reduce air recirculation within the housing.

In certain embodiments, the fan housing may incorporate a feature to reduce or eliminate recirculation of air drawn into the housing 10 by the rotating fan F. As shown in FIG. 10, the housing 10 may be modified to incorporate an interior cylindrical wall 70 surrounding the inlet openings 12. The wall 70 extends from the housing 10 so that the free edge 71 of the wall is slightly offset from the fan. The diameter of the wall is at least large enough to fully encircle all of the inlet openings 12, and is preferably slightly greater than the diameter of the fan. The cylindrical wall 70 thus concentrates the air drawn through the inlet openings 12 onto the fan F, while also preventing air discharged by the fan from recirculating toward the inlet openings, thereby improving the airflow efficiency of the cooling system.

Figure 6:
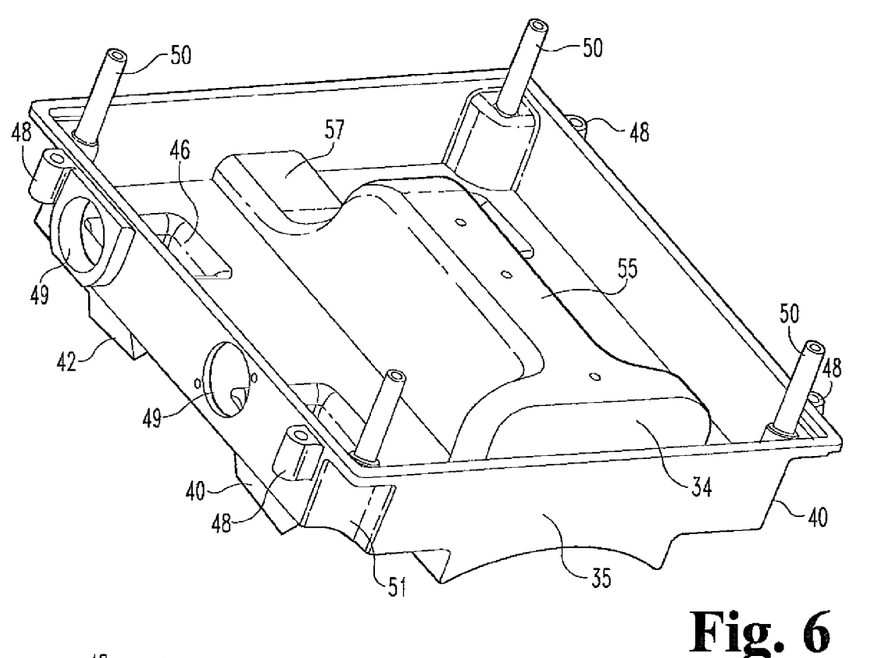
FIG. 6 is a top perspective view of a housing base portion of the cooling system shown in FIGS. 4-5.

In addition to the interface at the diverter chamber 20, the base 30 of the control box C is also mounted to the outside of the motor housing H, as shown in FIG. 2, by way of forward mounting bosses 40 and rear mounting bosses 42. As shown in FIGS. 4-7, these bosses are integral with the base 30. The mounting bosses 40, 42 define recesses 45, 46 that communicate with the interior of the control box C. Each of the mounting bosses 40, 42 includes a bolt hole 43 for passage of a mounting bolt to engage the motor housing H. As can be appreciated from the figures, the recesses 45, 46 are oriented at an angle relative to the base 30 with the bolt holes 43 directed radially inward toward the motor housing H. This orientation allows mounting bolts to be introduced through the recesses 45, 46 and the bolt holes 43 into engagement with the motor housing H, even when the components E of the control box C are supported by the base 30. As explained in more below, heat is withdrawn from the components E by way of a heat sink 55 (FIG. 6). Thus, the components E are supported within the control box C so that heat-generating components are in direct contact with the heat sink 55. These components are typically mounted on a circuit board, so the base 30 of the present embodiment includes mounting posts 50 projecting upward from the base. Screws passing through the mounting posts 50 mount the circuit board to the base 30. It is noted that recesses 51 (FIG. 7) may be provided in the outside of the base 30 for tool access to thread the mounting screws through the posts and into the circuit board.

Due to manufacturing considerations, the circuit board carrying the electrical/electronic components E must be mounted to the base 30 before the base can itself be mounted to the motor housing H and fan housing 10. Furthermore, in order to maintain as small a profile as possible for the base 30 and cover 32 of the control box C when assembled, the bolts used to fasten the box to the motor housing are driven from inside the control box. It can thus be appreciated that the assembled circuit board limits access to the bolt holes 43 in the mounting bosses 40, 42. Consequently, in one feature of the present design, the recesses 45, 46 allow the mounting bolts to pass under the circuit board mounted on the mounting posts 50, and be driven into the motor housing at an easily accessible angle.

Once the base 30 has been mounted to the motor housing, the cover 32 may be engaged to the base 30 to form the fully enclosed control box C. Thus, cover mounting bosses 48 may be provided at locations on the outer perimeter of the base 30. The cover 32 is provided with corresponding bosses 33 to receive screws that are threaded into the bosses 48 of the base 30.

One of the mounting bosses, such as the forward mounting bosses 40, may be provided with openings 44 in addition to the bolt holes 43. These additional openings 44 provide an enclosed path for wiring to connect between the components E and the motor M within the motor housing H. A corresponding opening is also provided in the motor housing H to receive the wires passing from the control box C.

Wires passing into the control box C may pass through openings 49 provided in the base 30. These openings 44 may include a seal, such as a grommet, to provide a fluid tight seal.

Figure 9:
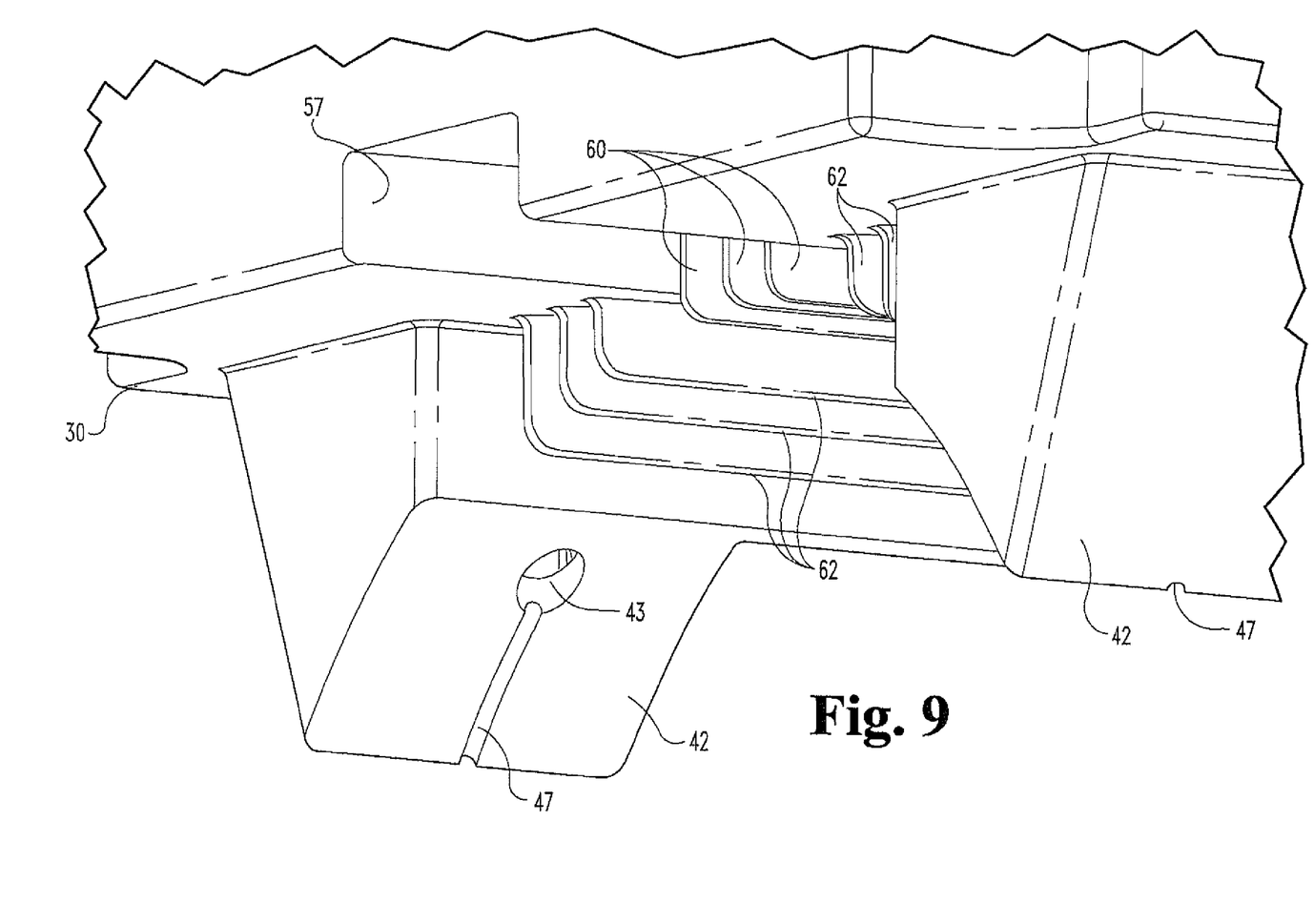
FIG. 9 is an enlarged perspective view of a portion of the housing base shown in FIGS. 5-8.

A further feature is incorporated into the mounting bosses 40, 42, as shown in the detail view of FIG. 9. In particular, at least some, and in one exemplary embodiment all, of the bolt holes 43 defined in the bosses include a drain channel 47 that communicates outside the boss. Although it is contemplated that the base 30 and cover 32 provide a water-tight seal, there is a possibility of condensation within the control box. The bolt holes 43 and drain channel 47 provide an exit path for any water collecting within the control box C.

Figure 7:
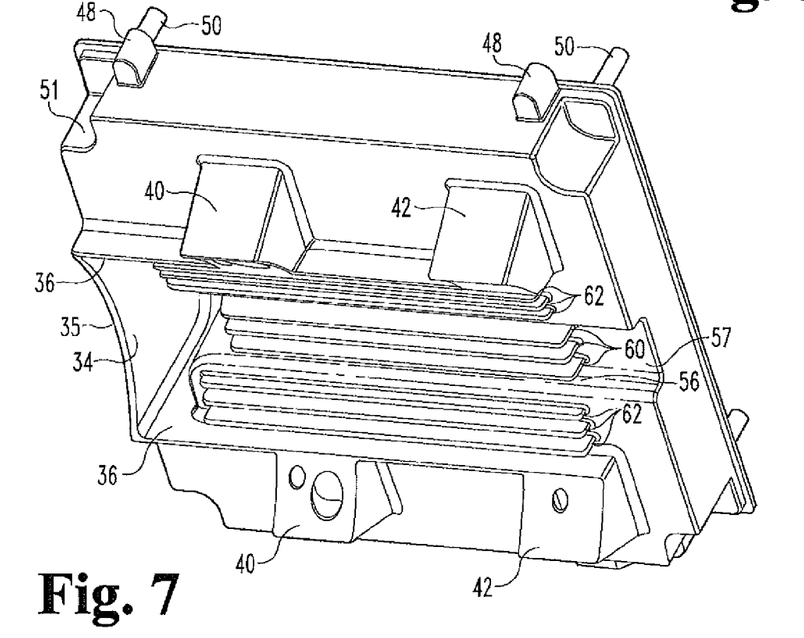
FIG. 7 is a bottom perspective view of the housing base shown in FIG. 6.
Figure 8:
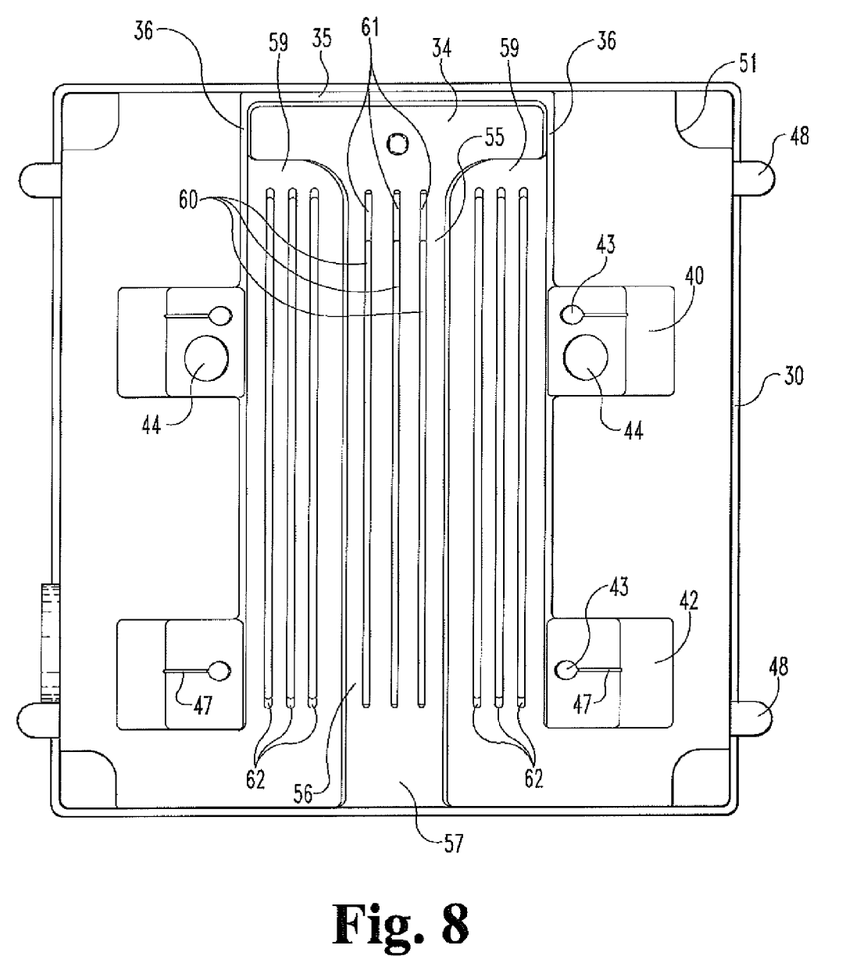
FIG. 8 is a bottom elevational view of the housing base shown in FIGS. 5-6.

Turning now to further details of the construction of the base 30 of the control box, reference is made to FIGS. 7-8. One object of the present cooling system is to help cool the components E within the control box C. In the illustrated embodiment, this cooling is accomplished by a heat sink 55. As explained above, a circuit board is supported on mounting posts 50 so that the heat generating components are in contact with the heat sink 55. Heat is dissipated from the heat sink by airflow beneath the heat sink—i.e., between the base 30 of the control box C and the motor housing H on which the base is mounted.

The heat sink 55 projects upward into the interior of the control box, as shown in FIG. 6. The heat sink thus also defines a main channel 56 extending from the diverter plenum 34 to an outlet 57, as shown in FIGS. 4-5 and 7-8. It can thus be appreciated that airflow diverted from the fan F passes through the diverter plenum 34 and into the main channel 56. The base 30 is also configured to form side channels 59 that flank the main channel 56 beneath the heat sink 55. These side channels 59 define a flow area that is smaller than the flow area of the main channel 56, so the airflow in the side channels will be less.

The heat dissipation area of these channels 56, 59 is increased by the addition of cooling fins. Thus, the main channel 56 includes a plurality of main fins 60 that project downward toward the motor housing H, and extend from adjacent the diverter plenum 34 to the outlet 57. Likewise, the side channels 59 include a plurality of side fins 62 that extend from adjacent the plenum to the outlet. The fins 60, 62 have a height sufficient to bridge the gap between the base 30 and the motor housing H, in this way creating a plurality of discrete flow paths between the fins. In order to reduce flow recirculation entering the main channel 56, the main fins 60 include angled leading ends 61, as best seen in FIG. 8. The ends 61 are cut at about a 60° angle to optimize their effect. The side fins 62, although providing minimal heat transfer capability, do enhance the axial airflow through the main channel 56.

It is contemplated that the entire base 30 of the control box is formed as a single piece, such as by casting. In order to maximize the heat sink and heat dissipation capabilities of the base 30, it may be formed of a conductive material, such as a metal (e.g., aluminum). Alternatively, the heat sink 55 and fins 60, 62 may be metal while the remainder of the base 30 is non-metallic. It is further contemplated that the base 30 and the fan housing 10 may be integrally formed if desired.

While the invention has been illustrated and described in detail in the drawings and foregoing description, the same should be considered as illustrative and not restrictive in character. It is understood that only the exemplary embodiments have been presented and that all changes, modifications and further applications that come within the spirit of the invention are desired to be protected.

What is claimed is:

1. A cooling system for a motor having control circuitry and including a motor housing surrounding the motor, the motor driving at least one radial fan at one end thereof for directing airflow across the motor housing, the cooling system comprising:
  a fan housing mountable to the motor housing at the one end of the motor, said fan housing defining a cavity surrounding the radial fan and configured to direct airflow from the fan axially across the motor housing, said fan housing further defining a diverter chamber radially outboard of the fan, sized to divert a portion of the airflow away from the motor housing; and a base having a heat sink for contacting the control circuitry, said base defining a plenum in communication with said diverter chamber and a channel in communication with said plenum and said heat sink to direct the diverted airflow across the heat sink, wherein said base includes side walls defining said plenum and configured for a tight fit with said diverter chamber of said fan housing for a substantially airtight seal.

2. The cooling system of claim 1, wherein said channel includes a plurality of cooling fins projecting therefrom into the airflow passing therethrough.

3. The cooling system of claim 2, wherein said channel includes a main channel corresponding to said heat sink and at least one side channel flanking said main channel.

4. The cooling system of claim 3, wherein said main channel defines a flow area greater than said at least one side channel.

5. The cooling system of claim 3, wherein each of said channels includes a plurality of cooling fins.

6. The cooling system of claim 2, wherein:
said base includes mounting bosses for supporting said base on the motor housing, said mounting bosses sized to offset said heat sink from the motor housing to define said channel; and
said plurality of fins are sized to contact the motor housing when said base is supported thereon.

7. The cooling system of claim 3, wherein said main channel includes a plurality of cooling fins, said fins having a leading edge adjacent said plenum that is angled.

8. The cooling system of claim 1, wherein:
said base includes a mating wall and side walls defining said plenum and said channel, said walls configured for a close fit within said diverter chamber of said fan housing; and
said fan housing defining a raised lip at the interface between said walls and said diverter chamber.

9. The cooling system of claim 1, wherein said fan housing includes a circumferential surface defining said cavity, said circumferential surface merging into a scroll surface adjacent said diverter chamber to direct airflow from the cooling fan into said chamber.

10. The cooling system of claim 1, wherein said fan housing:
defines an air inlet axially aligned with the radial fan; and
further includes a cylindrical wall surrounding said air inlet.

11. The cooling system of claim 1, wherein said base defines:
a hollow interior to contain the control circuitry therein; and
at least one mounting boss for supporting said base on the motor housing, said mounting boss defining a bolt hole in communication with said hollow interior, said bolt hole sized to receive a mounting bolt therethrough for engagement with the motor housing, and said mounting boss defining a drain channel between said mounting boss and the motor housing when said base is mounted thereon, said drain channel in communication with said bolt hole.

12. The cooling system of claim 2, wherein said plurality of cooling fins have a leading edge adjacent said plenum that is angled.

13. An assembly comprising:
a motor;
control circuitry electrically connected to said motor;
a motor housing substantially surrounding said motor;
a radial fan disposed at one end of said motor and driven by said motor;
a fan housing mounted to said motor housing at said one end of said motor, said fan housing defining a cavity surrounding said radial fan and configured to direct airflow from said fan axially across said motor housing, said fan housing further defining a diverter chamber radially outboard of said fan, sized to divert a portion of the airflow away from said motor housing; and
a base having a heat sink for contacting said control circuitry, said base defining a plenum in communication with said diverter chamber and a channel in communication with said plenum and said heat sink to direct the diverted airflow across said heat sink, wherein said base includes side walls defining said plenum and configured for a tight fit with said diverter chamber of said fan housing for a substantially airtight seal.

14. The assembly of claim 13, wherein said channel includes a plurality of cooling fins projecting therefrom into the airflow passing therethrough.

15. The assembly of claim 13, wherein said base defines:
a hollow interior to contain said control circuitry therein; and
at least one mounting boss for supporting said base on said motor housing, said mounting boss defining a bolt hole in communication with said hollow interior, said bolt hole sized to receive a mounting bolt therethrough for engagement with the motor housing, and said mounting boss defining a drain channel between said mounting boss and said motor housing when said base is mounted thereon, said drain channel in communication with said bolt opening.

16. The assembly of claim 15, wherein said at least one mounting boss includes a plurality of similarly configured mounting bosses, and at least one of said similarly configured mounting bosses defines an additional opening for passage of electrical wiring from said control circuit to said motor.

* * * * *